US008085195B2

(12) United States Patent
Abraham

(10) Patent No.: US 8,085,195 B2
(45) Date of Patent: *Dec. 27, 2011

(54) METHOD AND APPARATUS FOR PROVIDING A GLOBAL SECURE USER PLANE LOCATION (SUPL) SERVICE

(75) Inventor: Charles Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/750,272

(22) Filed: Mar. 30, 2010

(65) Prior Publication Data
US 2010/0182196 A1    Jul. 22, 2010

Related U.S. Application Data

(63) Continuation of application No. 11/261,413, filed on Oct. 28, 2005, now Pat. No. 7,714,779.

(51) Int. Cl.
*G01S 19/05*      (2010.01)

(52) U.S. Cl. ............................................... 342/357.42
(58) Field of Classification Search ............ 342/345.42, 342/357.42
See application file for complete search history.

(56) References Cited

U.S. PATENT DOCUMENTS

| 6,204,808 | B1 * | 3/2001 | Bloebaum et al. | 342/357.42 |
| 7,714,779 | B2 * | 5/2010 | Abraham | 342/357.31 |
| 2001/0014604 | A1 * | 8/2001 | Kingdon et al. | 455/427 |
| 2005/0043038 | A1 * | 2/2005 | Maanoja et al. | 455/456.1 |
| 2005/0118999 | A1 * | 6/2005 | Zhu | 455/432.1 |
| 2005/0153687 | A1 | 7/2005 | Niemenmaa et al. | |
| 2005/0239480 | A1 | 10/2005 | Kim et al. | |
| 2007/0182547 | A1 * | 8/2007 | Wachter et al. | 340/539.13 |

* cited by examiner

*Primary Examiner* — Gregory C Issing
(74) *Attorney, Agent, or Firm* — McAndrews, Held & Malloy, Ltd.

(57) ABSTRACT

A method and apparatus for providing assistance data for satellite positioning system receivers utilizing a secure user plane location (SUPL) service. In one embodiment, the assistance data is supplied by a global secure user plane location center that contains global assistance data.

13 Claims, 4 Drawing Sheets

METHOD AND APPARATUS FOR PROVIDING A GLOBAL SECURE USER PLANE LOCATION (SUPL) SERVICE

This application claims the benefit of, and is a continuation of U.S. Application Ser. No. 11/261,413, filed Oct. 28, 2005 that issued as U.S. Pat. No. 7,714,779 by Abraham.

BACKGROUND OF THE INVENTION

1. Field of the Invention

Embodiments of the present invention generally relate to satellite position location systems and, more particularly, to a method and apparatus for providing a secure user plane location (SUPL) service to provide global assistance information to a location enabled device.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delay multiplied by the speed of light provides the distance from the receiver to each of the satellites that are in view of the receiver. More specifically, each GPS signal available for commercial use utilizes a direct sequence spreading signal defined by a unique pseudorandom noise (PN) code (referred to as the course acquisition (C/A) code), having a 1.023 MHz spread rate. Each PN code bi-phase modulates a 1575.42 MHz carrier signal (referred to as the L1 carrier), and uniquely identifies a particular satellite. The PN code sequence length is 1,023 chips, corresponding to a one millisecond time period. One cycle of 1,023 chips is called a PN frame or epoch.

GPS receivers determine the time delays between the transmission and the reception of the signals by comparing time shifts between the received PN code signal sequence and the internally generated PN signal sequences. These measured time delays are referred to as sub-millisecond pseudoranges, since they are known modulo the one-millisecond PN frame boundaries. By resolving the integer number of milliseconds associated with each delay to each satellite, then true, unambiguous pseudoranges are determined. A set of four pseudoranges together with knowledge of absolute time of transmission of the GPS signals and satellite positions in relation to these absolute times is sufficient to solve for the position of the GPS receiver. The absolute times of transmission (or reception) are needed in order to determine the positions of the GPS satellites at the times of transmissions, and hence to compute the position of the GPS receiver. The satellite positions may be obtained from satellite trajectory data broadcast by the satellites, referred to as ephemeris.

In some GPS applications, the signal strengths of the satellite signals are so low that either the received signals cannot be processed, or the time required to process the signals is excessive. As such, to improve the signal processing, a GPS receiver may receive assistance data from a network to assist in satellite signal acquisition and/or processing. For example, the GPS receiver may be integrated within a cellular telephone and may receive the assistance data from the server using a wireless communications network. This technique of providing assistance data to a remote receiver has become known as "assisted-GPS," or A-GPS.

The assistance data that is provided is, in part, the orbits of the satellites that are in view of the receiver. For the server that provides the assistance data to know which satellite orbits are to be sent to the A-GPS receiver, the assistance data server must know an approximate position of the A-GPS receiver. From this position estimate, the A-GPS assistance server can compute which satellites are in view at the particular time of the request to the A-GPS receiver, and send the orbits of those particular satellites. These orbits can be used by the A-GPS receiver to narrow the search window for satellite signal and improve the sensitivity of the A-GPS receiver such that the receiver is able to receive signals at very low signal strengths.

Typically, if the A-GPS receiver is embedded in a cellular telephone, when the cellular telephone contacts the cellular network via a cell tower, the cell tower is associated with a cell ID that identifies a particular cell within a network. The cell ID can be used by a secure user plane location (SUPL) service center (referred to as an SLC) to compute an estimated position of the cellular telephone. Generally, the cell ID of the cell being used is applied to a database of cell IDs for towers within a network. The database correlates the geographic positions of the cells with the cell IDs. As such, when given a cell ID, the database can provide a geographic position of a tower that services that cell. The position of the tower can be used as an estimate of the cell phone's position. Using this position estimate, the SLC may send GPS assistance data to the cellular phone that is relevant to the approximate position of the cellular telephone, i.e., such assistance data may include timing and satellite ephemeris for satellites that are in view of the cellular telephone at the estimated position.

When a person purchases a cellular telephone or other mobile device that uses the cellular telephone network for data and/or communications services, the device is assigned to a particular network as their "home" network. While operating in this home network, it is guaranteed that the SLC supplying assistance data to the home network understands the cell IDs that are supplied by the cellular system, such that the SLC can determine the estimated position of the cellular telephone. Generally, the cell ID database and estimated position information is contained within the SLC. The SLC uses a secure user plane location (SUPL) service to distribute information to a home network region of a cellular customer.

The SUPL standard, "Secure User Plane Location Requirements," version 1.0, July 2005, published by the Open Mobile Alliance, specifies the protocols used for communicating between the SLC and the cell phone. A third party may request a cellular telephone identify its location, or the cellular telephone may request its own position be calculated. For a third party to request a location, a SUPL enabled terminal (SET) (i.e., a mobile device (such as a cellular telephone) that is equipped to utilize SUPL services) is initially contacted by the third party through either a short message service (SMS) communication or a Wireless Application Protocol (WAP) Push Access Protocol (PAP)-based communication. If the SET requires assistance data to compute a location, the SET contacts the SLC via a TCP/IP message addressed to the Uniform Resource Locator (URL) of the SLC. Once the SUPL service is initiated such that the SET is assigned a dynamic TCP/IP address, TCP/IP-based messages can be exchanged with the SLC such that assistance data can be provided to the SET.

In a typical system, the SLC for a network region contains a reference GPS receiver for receiving satellite signals and decoding the signals to determine satellite ephemeris for each satellite in view of the SLC's reference GPS receiver. The SET (cell phone) that is serviced by the cell towers within the network region serviced by the SLC will "see" some or all of the satellites that are in view of the SLC's reference GPS receiver. From the received GPS satellite signals, the SLC creates and distributes TCP/IP messages containing GPS assistance data. As such, the assistance data is accurate for SET's that are within the SLC's region, i.e., accurate only for the SET's that see the same satellites as seen by the SLC's reference GPS receiver. The SET uses the assistance data as discussed above to enhance the sensitivity of the SET's GPS receiver and/or to improve the speed at which satellite signal acquisition may occur.

Although the distribution of assistance data via SUPL service in a home network operates very well; however, when that cellular customer roams into a non-home network (i.e., a roaming network), they may experience difficulty receiving an estimated position and assistance data. Under the SUPL standard, the SET contacts the home SLC for a position estimate based on the current cell ID and also requests assistance data from the home SLC. The SUPL standard defines a process by which the home SLC can request a position estimate from a local SLC (i.e., the roaming network SLC). However, an SLC may not exist in the roaming network or the SLC in the roaming network may not have the capability of providing a position estimate based on the cell ID. Lastly, the assistance data provided by the home SLC may not be accurate for the SET in the roaming network, i.e., the satellites that are in view in the home network may not be the same satellites that are in view in the roaming network. As such, location based services may not function in the roaming networks.

Therefore, there is a need in the art to ensure that a cellular subscriber that roams from their home network is provided with a position estimate, accurate assistance data, or other information such that their mobile device can compute a position accurately and with high sensitivity.

SUMMARY OF THE INVENTION

The present invention is a method and apparatus for utilizing a global secure user plane location (G-SUPL) service to provide accurate location assistance data to cellular telephone subscribers that are roaming from their home networks. In one embodiment of the invention, the mobile station (MS) or a third party requests location-based services using the G-SUPL service. If a local SLC cannot provide a position estimate or accurate assistance data to the MS, the MS requests the information from a global SLC (G-SLC). A world-wide reference network (WWRN) of reference GPS receivers produces a global satellite orbit model for all the satellites in a satellite positioning system (SPS) constellation of satellites. The G-SLC uses the global satellite orbit model to derive assistance data for any MS located anywhere in the world.

In another embodiment of the invention, the G-SUPL service is initiated using a message that is sent using a TCP/IP-based communication. e-mail message or a telephone call. Using TCP/IP-based communications, an e-mail message or telephone call for initiation avoids the user charges (fees) that are applied for using wireless application protocol (WAP) or a short messaging service (SMS) communications during initiation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and apparatus for providing a global secure user plane location (G-SUPL) service for a location enabled mobile station located anywhere in the world is described. Those skilled in the art will appreciate that the invention may be used with various types of mobile or wireless devices (referred to herein as mobile stations) that are "location enabled," such as cellular telephones, pagers, laptop computers, personal digital assistance (PDAs), and like type wireless devices known in the art. Generally, a location-enabled mobile device is facilitated by including in the device the capability of processing satellite positioning system (SPS) satellite signals, such as Global Positioning System (GPS) signals, GLONASS signals, GALILEO signals, and the like. Devices can be location enabled by using an AGPS processor such as the GL-20000 or HAMMERHEAD Processors available from Global Locate, Inc. of San Jose, Calif.

Figure 1:
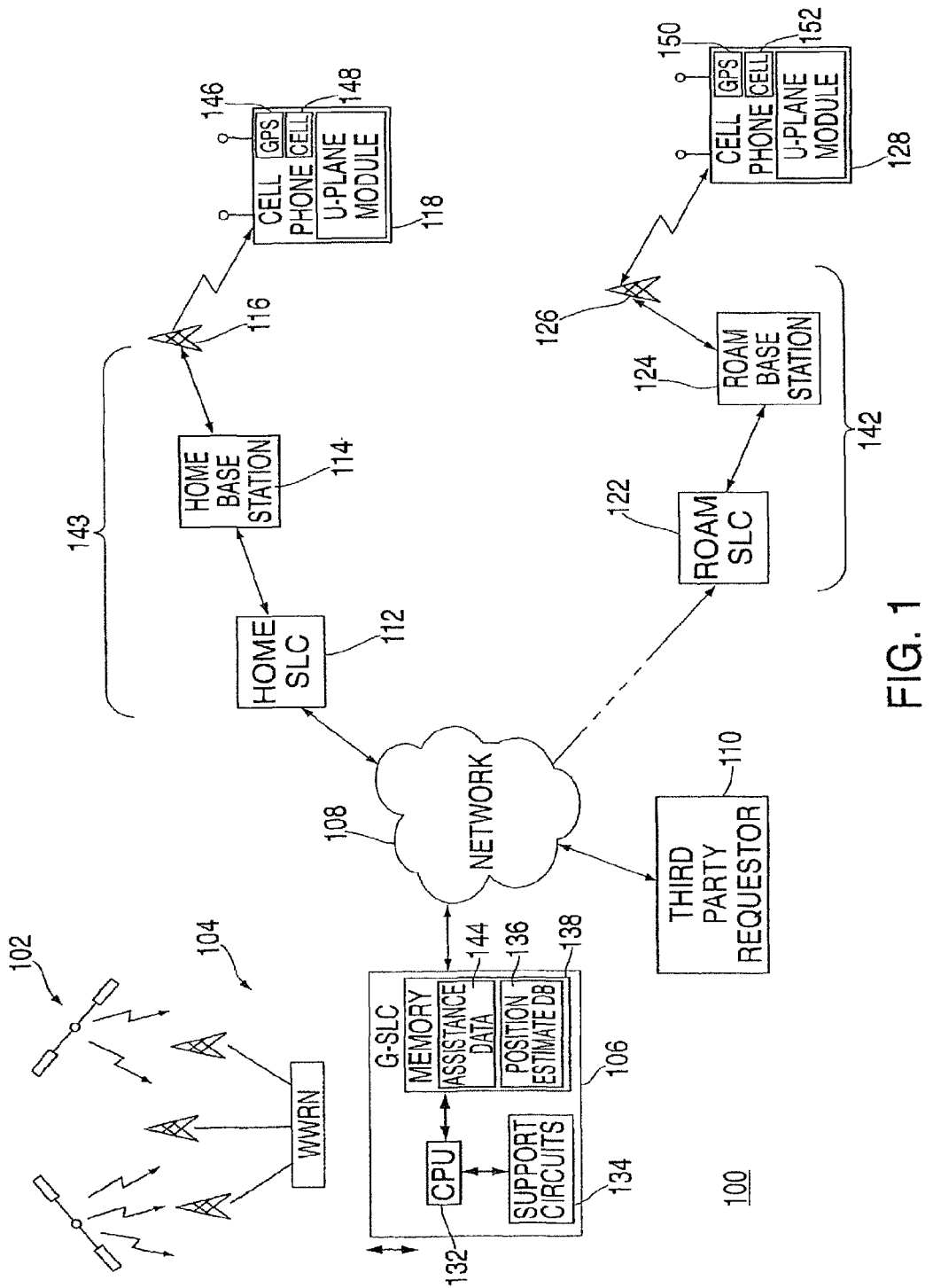
FIG. 1 is a block diagram depicting an exemplary embodiment of a satellite position location system in accordance with the present invention.

FIG. 1 depicts a block diagram of a system 100 for providing location-based services to a mobile stations 118, 128. The system 100 comprises a plurality of mobile stations 118, 128, a plurality of cellular communications networks 140, 142, a communications network 108 for providing location assistance data to the cellular networks 140 and 142, a G-SUPL location center 106 (also referred to as a G-SLC), and a worldwide reference network (WWRN) 104. The WWRN 104 receives satellite signals from a satellite constellation 102. The satellite constellation 102 may be one of a number of satellite positioning system (SPS) networks, including GPS, GLONASS, or GALILEO. One example of a worldwide reference network that aggregates assistance data for use by assisted-GPS systems is disclosed in commonly assigned U.S. Pat. No. 6,587,789, which is incorporated herein by reference in its entirety. The reference network 104 processes the received satellite signals to produce assistance data (timing and ephemeris information) and supplies the assistance data to the G-SLC 106. The assistance data 144 is stored in memory 136 of the G-SLC 106 and, upon request, is supplied to the cellular telephone subscribers or to the local SLCs 112, 122. The assistance data supplied to an SLC is generally the assistance data that is applicable to their respective region over a specific period of time.

Each of the mobile stations 118 and 128 contain a cellular transceiver 148, 152, an A-GPS receiver 146, 150, and a U-plane module 120, 130. The cellular transceivers 148, 152, communicate with a cell tower 116 in the home region 140, or communicate with a cell tower 126 within a roaming region 142.

Within the home region 140, where the cellular system 100 comprises a home SLC 112, a home base station 114, and a cellular tower 116, the mobile station communicates via its transceiver 148 to the cellular tower 116 in a conventional manner using, for example, the General Packet Radio Service (GPRS) to send and receive data. When location-based services are necessary, the transceiver 148 communicates with the home region cellular system 140 and requests a data transmission to assist the mobile station 118 in determining its position. When a subscriber initiates the request for position, a request for assistance data is sent from the mobile station to the SLC 112 using a TCP/IP message protocol. The message is processed by the U-plane module 120 and sent via GPRS using a SUPL layer. If a third party 110 requests a position of a mobile station, the initiation of the process may, in one embodiment of the invention, utilize a conventional SMS or WAP communication as a notification message propagated between the SLC 112 and the mobile station 118. In another embodiment of the invention, disclosed in detail with respect to FIG. 4 below, the initialization process may begin with a notification message being delivered as a telephone call, a TCP/IP packet, or an e-mail message. The third party will generally request a position using a web-based interface that will send a TCP/IP message to the SLC 112. In response to the message from the third party requester 112, the SLC 112 will then initiate the positioning process by sending the notification message to the mobile station 118. Upon initiation, the mobile station, if one is not already assigned, is assigned a dynamic TCP/IP address.

Once the communication path is initialized and the TCP/IP address assigned, the home SLC 112 sends, using a TCP/IP-based communication, assistance data to the mobile station 118. The mobile station 118 uses its A-GPS receiver and the assistance data to acquire and process satellite signals. Depending on the mode of operation of the mobile station, a position computation may occur in the mobile station or in the SLC 112. In a MS-based mode, the position computation is performed within the mobile station and either used locally or sent to the SPC 112 for transmission to the third party 110, depending upon whether the mobile station 118 or the third party 110 initiated the position request. In an MS-assisted mode of operation, received satellite signal information is sent to the SLC 112 where the position computation is performed. The computed position is then sent to the position requester.

In some home network regions 140, a home SLC 112 may not exist. As such, a mobile station 120 may use the TCP/IP address of the G-SLC 106 to receive assistance data. As shall be described below, such use of the G-SLC may be as the default SLC (primary SLC) for the mobile station 118 or as a "back-up" SLC (secondary SLC) when the home SLC is not able to or cannot provide accurate assistance data.

The G-SLC 106 comprises a central processing unit 132, support circuits 134, and memory 136. The CPU 132 may be one or more conventional microprocessors and/or microcontrollers. The support circuits 134 facilitate the operation of the CPU 132 and comprise well-known circuits, such as input/output circuits, cache, clock circuits, power supplies, network interface circuits and the like. The network interface circuit of the support circuits 134 is used for receiving and transmitting the TCP/IP communications in support of SUPL services. The memory 136 stores various software packages that are used to operate the G-SLC 106. The memory 136 may comprise random access memory, read-only memory, optical storage, magnetic storage, removable storage, and combinations thereof. In accordance with the present invention, the memory 136 contains assistance data 144 and, in one alternative embodiment, may further contain a position estimate database 138 that can be used for deriving position estimates (latitude and longitude) from cellular IDs throughout the world. This stored information can be accessed and distributed using the SUPL service to any mobile station anywhere in the world.

For example, when a mobile station 128 is not operating in its home network 140, but rather operates in a roaming network 142, the mobile station 128 uses the SUPL module 130 to invoke the SUPL service to communicate to the cell tower 126. The roaming mobile station 128 addresses its request for assistance data to its home SLC 112. This request contains the cell ID of the cellular tower 126 through which the mobile station 128 is communicating. In all likelihood, the home SLC 112 will not be able to determine the position estimate for the mobile station 128 since the cell ID of the roaming tower 126 will not be in the cell ID database of the home SLC 112.

If the position estimate is not available, the SLC 112 may request the position estimate from the roaming SLC 122 by sending the unknown cell ID to the SLC 122. The roaming SLC 122 will respond to the home SLC 112 with the position estimate corresponding to the cell ID. However, to facilitate such a transaction, the home SLC 112 must know the IP address of the roaming SLC 122. This is not always the case. Furthermore, even after the position estimate is provided, the home SLC 112 may not contain the appropriate assistance data for the mobile station 128 operating in a roaming region 142.

Since the G-SLC 106 contains assistance data that is applicable to any location; thus, when roaming, the mobile station 128 may direct all assistance data requests to the G-SLC 106, i.e., use the IP address of the G-SLC 106. The mobile station 128 may automatically direct communications to the G-SLC 106 when roaming, it may do so when instructed to do so by the SLC 112, or the home SLC 112 may redirect the request to the G-SLC 106 whenever the home SLC 112 cannot determine a position estimate or send accurate assistance data. The G-SLC 106 responds with the assistance data and sends the data to the mobile station's dynamic IP address.

The G-SLC 106 uses database 138 to identify the position estimate for the cellular tower 126 in the roaming network 142. In one embodiment of the invention, the G-SLC contains a database of all cell IDs worldwide, where each cell ID is correlated with a latitude and longitude location. In another embodiment, the G-SLC 106 contacts the SLCs or legacy location servers to request a latitude and longitude for a specific cell ID. The SLCs may be contacted via the Internet using the IP address of specific SLCs, i.e., using the SUPL protocol. Contacting legacy location servers is performed using a protocol such as the Mobile Location Protocol (MLP). MLP uses an HTTP transport to address the servers and request information. The G-SLC 106 can select a protocol, including SUPL, MLP, or any other appropriate protocol that is appropriate in contacting a server having knowledge of the cell ID used by a particular mobile station.

From the position estimate, the G-SLC 106 provides the assistance data fro the satellites that are in view of the mobile station 128 located at the position estimate. The mobile station 128 uses the assistance data to enhance the GPS receiver's sensitivity and/or improve the speed at which satellite signals are acquired.

If a cell ID is not available at all, then the G-SLC 106 uses whatever information is available to estimate a position. In an alternative embodiment of the invention, a position estimate for the mobile station 128 may not be available, or may not be accurate, i.e., only the country code of the mobile station is known, only the hemisphere of operation is known, and the like. In those instances, the G-SLC 106 provides the "best" assistance data that it has available.

The "best" assistance data is the data that will provide the most accurate position of the mobile station given an initial position estimate of a particular accuracy. As such, the assistance data that is provided to the mobile station is dependent upon the accuracy of the initial position estimate. For example, if only the country of operation is known, the G-SLC 106 sends assistance data that is relevant to the country's geographic location, e.g., satellite orbit information (ephemeris, orbit models, pseudo-range models, and the like as well as time of day and other information) for satellites in view of any mobile station anywhere in that country. If no position estimate is available at all, the G-SLC 106 may send satellite orbit information for all the satellites in the constellation. Alternatively, the G-SLC 106 may utilize an "intelligent" algorithm that predicts the possible location of the mobile station 128 based upon the last known position of the mobile station or a position extrapolated from a set of prior positions. From the known information regarding the position of the mobile station, the G-SLC 106, creates an optimal set of assistance data that is used to acquire satellite signals and, ultimately, determine the mobile station position.

Figure 2:
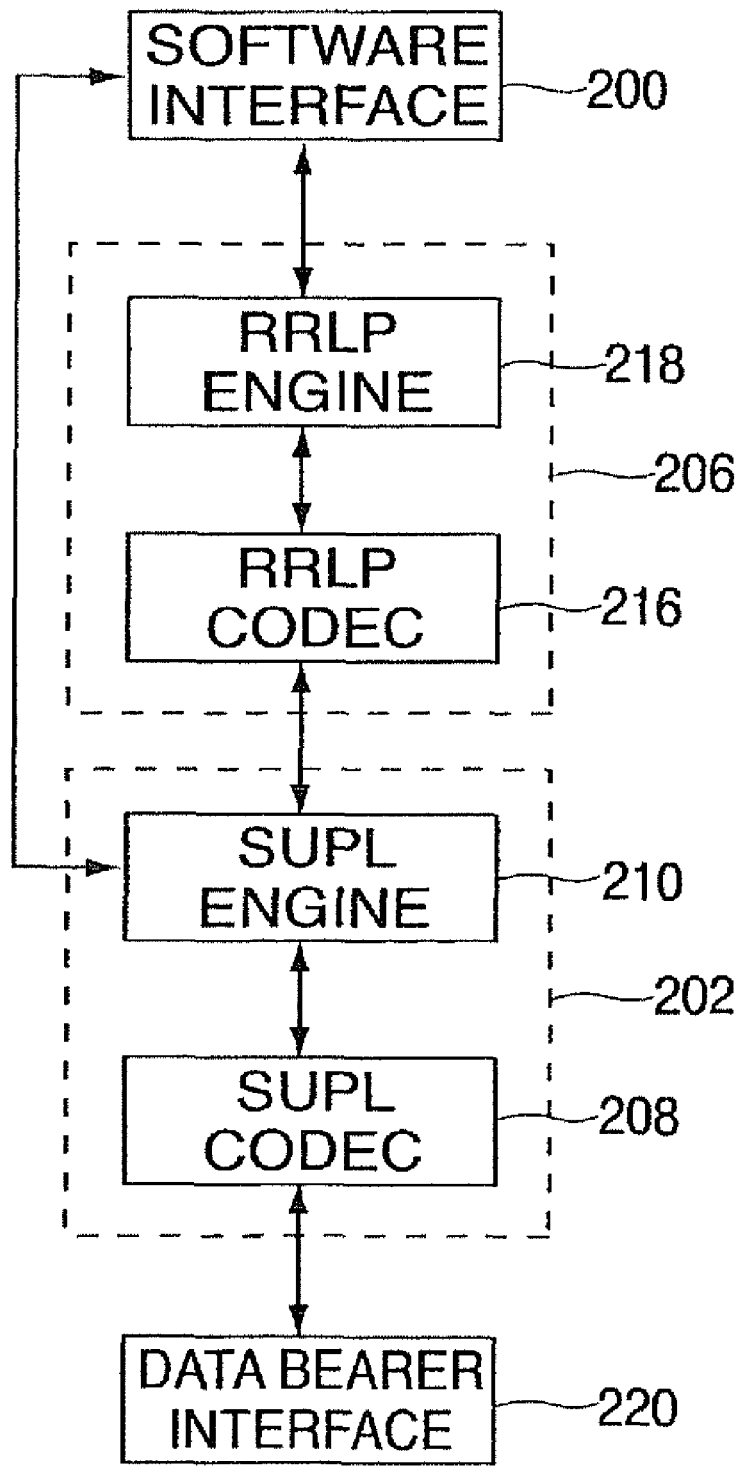
FIG. 2 is a block diagram depicting an exemplary embodiment of a user plane module constructed in accordance with the present invention.

FIG. 2 is a block diagram depicting an exemplary embodiment of a SUPL module 120, 130, constructed in accordance with the present invention. The module 120, 130 comprises a software interface 200 that communicates with the mobile station's central processing unit such that requests for information and data can be transmitted and received through the SUPL module 120, 130. The SUPL module 120, 130 comprises a radio resource link protocol (RRLP) module that includes an RRLP codec 216 and an RRLP engine 218. Furthermore, the SUPL engine 210 and SUPL codec 206 communicate from the software interface 200 and the RRLP codec 216 to the data bearer interface 220 that communicates with a data network of the cellular system.

In operation, location-based service messages are received and transmitted through the data bearer interface 220. Depending on the receiving/transmitting interface, the location service messages are processed by the SUPL module 120, 130. Data from the software interface 200 of the A-GPS receiver is processed by SUPL module 120, 130 to produce location service messages for transmission. Data is extracted from the received location service messages by the SUPL module 120, 130 for driving the software interface 200.

The SUPL codec 208 and the SUPL engine 210 cooperate with the software interface 200 to provide for mobile station originated position requests through SUPL. In addition, the SUPL codec 208 and the SUPL engine 210 pass RRLP PDUs to the module 206, which provides the server-originated position requests in SUPL, as well as receive an acknowledgement of assistance data.

The SUPL codec 208 is in communication with the data bearer interface 220 and the SUPL engine 210. The data bearer interface 220 comprises an IP layer and a transport layer, such as a user datagram protocol (UDP) transport layer, a transmission control protocol (TCP) transport layer, a hypertext transport protocol (HTTP) transport layer, and the like. That is, the data bearer interface 220 implements an IP stack capable of operating with one or more transport protocols. The data bearer interface 220 extracts SUPL messages from the received IP packets and packetizes the SUPL messages to form IP packets for transmission. The SUPL codec 208 decodes SUPL messages received from the data bearer interface 220 to produce protocol data (PD) messages and uses the PD messages to produce SUPL messages. Notably, SUPL messages may be in a binary bit packed format, such as an ASN.1 format.

The SUPL engine 210 handles the user plane protocol. Notably, the SUPL engine 210 analyzes received PD messages for content. If a received PD message contains an RRLP PDU, the SUPL engine 210 extracts the RRLP PDU from the PD message and passes the RRLP PDU to the RRLP PD codec 216. Otherwise, the SUPL engine 210 passes the data in the received PD message to the software interface 200. The SUPL engine 210 packages RRLP PDUs received from the RRLP codec 216 to produce PD messages. In addition, the SUPL engine 210 packages data received from the software interface 200 to produce PD messages. For the detailed understanding of the SUPL, the reader is referred to "Secure User Plane Location Requirements," version 1.0, July 2005, published by the Open Mobile Alliance, which is incorporated herein by reference.

Figure 3:
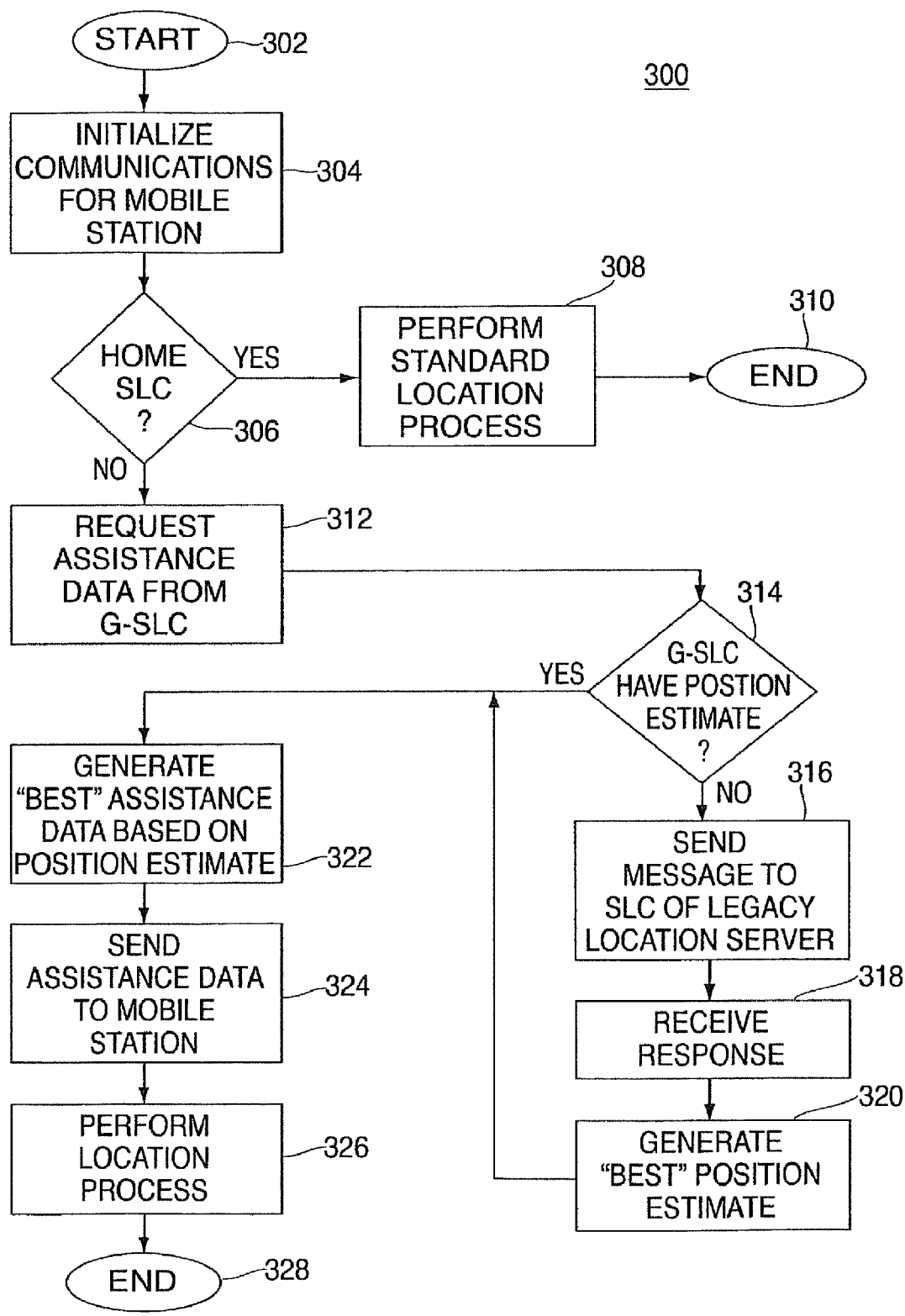
FIG. 3 depicts a flow diagram of a method of operation of a system utilizing the present invention.

FIG. 3 depicts a flow diagram of a method 300 of operation of the system 100 of the present invention. The method 300 begins at step 302 and proceeds to step 304. At step 304, the method 300 initializes communications with the mobile station. A discussed below with respect to FIG. 4, such initialization may occur in response to a request for the mobile station's position from a third party or from a request from the mobile station for its own position. In either instance, the mobile station is dynamically assigned an IP address to facilitate TCP/IP-based communications between the mobile station and the Internet.

To acquire satellite signals with high sensitivity and/or rapidly, the mobile station requires assistance data in the form of timing information and satellite position/orbit information (e.g., ephemeris). The assistance data may be provided by a home SLC, if such an SLC exists and, if existing, the assistance data is accurate. In one embodiment of the invention, a home SLC is not necessary or used, and all assistance data requests are routed to the G-SLC. In such a system, step 306 is not necessary.

At step 306, the method queries for information about the home SLC, e.g., does a home SLC exist and, if one does, is its assistance data accurate. Thus, if the home SLC can provide a cell ID and a position estimate that results in useable assistance date, e.g., ephemeris of satellites that are in view of the mobile station, then the method 300 proceeds to step 308. At step 308, a standard location process is performed using the assistance data to enhance receiver sensitivity and/or improve signal acquisition. One particular process for using assistance data for improving receiver sensitivity is disclosed in commonly U.S. Pat. No. 6,704,651, issued Mar. 9, 2004, which is incorporated herein by reference. Once acquired, the satellite signals can be used in various known ways to produce an accurate position for the mobile station. The method ends at step 310.

If the home SLC cannot provide the necessary assistance data at step 306, the method 300 proceeds to step 312. At step 312, the method 300 requests assistance data from the G-SLC, i.e., a TCP/IP message is sent from the mobile station to the IP address of the G-SLC. At step 314, the method 300 queries whether the G-SLC contains a position estimate for the mobile station. If a cell ID is provided by the mobile station and the cell ID corresponds to a position estimate in the database of the G-SLC, the method 300 proceeds to step 322 using an "accurate" position estimate.

If the cell ID is not known, is not provided, or is not correlated with a position in the G-SLC database, the method 300 proceeds to step 316 to attempt to determine the "best" position estimate given the circumstances, i.e., the most accurate position estimate that is available. At step 316, the method 300 sends a message to an SLC or legacy location server using SUPL, MLP, or another communication protocol. These protocols are defined by the network through which the mobile station is communicating. The method 300 will select the protocol that is suited to communicate with the network used by the mobile station. At step 318, a response is received from the SLC or legacy location server. This response may include a position estimate corresponding to a cell ID or no information or response at all. Other possible responses might include other information regarding the position of the mobile station, e.g., country code, region, or some other position information. The method 300 may also use the last known position of the mobile device as the position estimate, derive a position estimate from past known positions, i.e., extrapolate a position, and the like. From any of these techniques, step 320 generates the "best" position estimate that can be produced under the circumstances.

At step 322, the method 300 uses the position estimate (whether accurate from a cell ID or a "best" position estimate) to determine the "best" assistance data that corresponds to the position estimate. The timing and ephemeris information for satellites in view of the position estimate are contained in the assistance data. If the mobile station position estimate is unknown, the G-SLC creates assistance data containing the timing and ephemeris for all satellites in the constellation. Although the mobile station will need to determine the satellites that are in view, the mobile station will not have to decode the navigation information for the satellites, since that information will already be in memory. As such, signal acquisition improvement will result.

At step 324, the assistance data is sent to the mobile station. A step 326, the method 300 performs satellite signal acquisition using the assistance data as a portion of a location process. Signal acquisition and location computation techniques are well known in the art. Such techniques are disclosed in commonly assigned U.S. Pat. Nos. 6,704,651, 6,453,237, 6,417,801, 6,429,814, and 6,606,346, each of which is incorporated herein by reference. The method 300 ends at step 328.

In this manner, a source of global assistance data is available as either a primary source of assistance data or as a secondary source of such data if a primary source (home SLC) does not contain the necessary data. The global SLC enables mobile stations located anywhere in the world to be located using high sensitivity and rapid satellite signal acquisition techniques.

Figure 4:
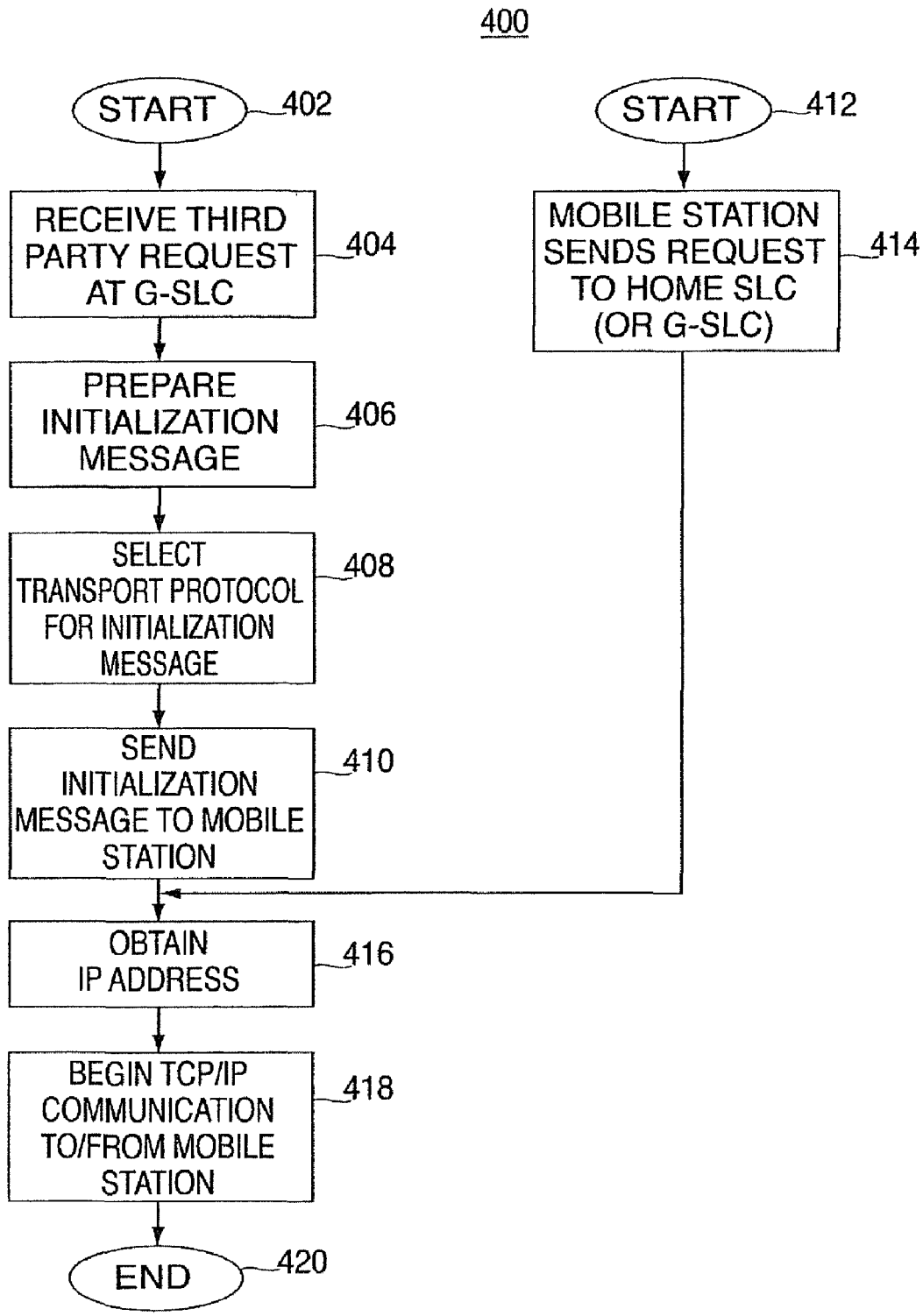
FIG. 4 depicts a flow diagram of a method of initializing a SPL communication in accordance with the invention.

FIG. 4 depicts a flow diagram of a method 400 of initializing a SUPL communication. The method begins at either step 402 (third party initialization) or step 412 (mobile station initialization). When starting from a third party request, the request is received at the G-SLC from a third party. The request message is generally a TCP/IP-based message transported through the Internet to the IP address of the G-SLC. The third party typically requests the position of a mobile station via a web portal, e.g., a web site of a provider of location based services. The message generally contains a mobile station identifier (e.g., user number, telephone number, or the like).

At step 406, the method 400 prepares an initialization message (also referred to as a notification message) to be sent to the designated mobile station. At step 408, the method 400 selects a transport protocol to utilize in sending the message. The transport protocol may include a telephone call, an e-mail message or a TCP/IP-based message. The selected protocol is used at step 410 to send the initialization message to the mobile station.

For an SMS- or WAP-message, the telephone number of the mobile station is used to identify and address the message in a standard manner. To send e-mail or a TCP/IP message, an IP address must be known for the mobile station. However, typically, with every GPRS session, an IP address is dynamically assigned to the mobile station. As such, a process (discussed below) is needed to enable the G-SLC to know the currently assigned IP address for the mobile station.

At step 416, upon receiving a notification message requesting a position, the mobile station activates the GPS receiver and also activates a GPRS session (if such a session is not already activated). The GPRS session uses a DHCP server in a conventional manner to assign an IP address to the mobile station. If a TCP/IP-based notification message is used, the G-SLC must a priori know the IP address of the mobile station. Since most mobile stations are not assigned a static IP address, a dynamic IP address assignment process is used. As such, a Gateway GPRS Support Node (GGSN) of the mobile station, which provides the DHCP service to the mobile station and handles all of a particular user's Internet traffic, assigns a "context" to the mobile station, i.e., the mobile station is assigned a Network Address Translation (NAT) table entry. The NAT table entry enables the GGSN to translate the mobile station's generic address and port number into an addressable port number and IP address. The GGSN may be used to send IP address updates for the mobile station to the G-SLC. Thus, with each update of the IP address the G-SLC is informed and can address notification messages appropriately to reach the mobile station. The mobile station may also send the G-SLC a periodic "hello" message via an IP network to continuously inform the G-SLC of the IP address assigned to the mobile station. Alternatively, the G-SLC may send the mobile station the periodic "hello" message via the IP network to continuously receive the IP address assigned to the mobile station.

Alternatively, the G-SLC may send an e-mail notification message to an e-mail address associated with the mobile station. The e-mail service provider utilizes either a push or pull e-mail delivery session that communicates the e-mail notification message to the mobile station. The content or subject of the e-mail notification message causes the mobile station to initialize a SUPL session and obtain an IP address.

In another alternative embodiment, the G-SLC may place a telephone call to the mobile station. If the mobile station is not a cellular telephone, the telephone call may be automatically "answered" and the mere reception of the call is the notification message that initializes the SUPL session and obtain an IP address. Furthermore, the telephone call need not be answered. The mere connection of a call may operate as a notification message.

Once the IP address is obtained in step 416, the method 400 proceeds to step 418 where TCP/IP based communications to/from the mobile station begin using the SUPL layer. The initialization process ends at step 420.

At step 412, the mobile station may initiate the position process. At step 414, the mobile station sends a request for a position to the home SLC or the G-SLC. This request is generally sent via the SUPL layer using a GPRS session. When the request is initiated, the GPRS session initiates the assignment of an IP address at step 416, assuming an IP address is not currently assigned. Once an IP address is assigned, at step 418, the G-SLC and the mobile station communicate using SUPL. The initialization process ends at step 420.

As disclosed above, using the present invention, a cellular subscriber is able to use location-based services anywhere in the world, even when they are roaming outside of their home network. The G-SLC can provide a position estimate and assistance data to any cellular subscriber anywhere in the world.

While the foregoing is directed to embodiments of the present invention, other and further embodiments of the invention may be devised without departing from the basic scope thereof, and the scope thereof is determined by the claims that follow.

The invention claimed is:

1. A method of receiving location based services for a mobile station having a satellite positioning system receiver, comprising:
   providing a request from the mobile station for assistance data for the satellite positioning system receiver at a global secure user plane location center (G-SLC), where the G-SLC comprises a database of cell identifiers, said database of cell identifiers storing:
      an identification of a plurality of cell towers in a plurality of networks, wherein at least one of the cell towers in at least a first of the plurality of networks is supported by a first home secure user plane location center (H-SLC) and at least one of the cell towers in at least a second of the plurality of networks is supported by a second home H-SLC; and
      a location for each of the plurality of cell towers in the plurality of networks;
   generating assistance data at the G-SLC, where the assistance data corresponds to a position estimate for the mobile station, wherein the mobile station is in radio communication with a particular cell tower, and wherein the position estimate is a location for the particular one of the cell towers in the database of global assistance data if the particular cell tower is one of the plurality of cell towers in the database of cell identifiers; and
   receiving the assistance data to the mobile station.

2. The method of claim 1 further comprising: requesting assistance data from a home SLC; and
   if assistance data is not available from the home SLC, requesting assistance data from the G-SLC.

3. The method of claim 1 wherein the database of cell identifiers stores an identification of cell towers and a position for cell towers located substantially throughout the world.

4. The method of claim 1 wherein the generating step further comprises:
   generating assistance data having a content that is based upon an accuracy of the position estimate of the mobile station.

5. The method of claim 1 wherein, when the position estimate is unknown, generating, as at least a portion of the assistance data, satellite ephemeris for all satellites in a satellite positioning system.

6. The method of claim 1 further comprising prompting the request for assistance data after initialization of a secure user plane location service.

7. The method of claim 1 further comprising: prompting the request for assistance data to be transmitted by the mobile station using a notification message propagated to the mobile station via an IP network.

8. The method of claim 7 wherein the notification message is an e-mail message.

9. The method of claim 7 wherein the notification message is a TCP/IP communication.

10. The method of claim 1 further comprising: prompting the request for assistance data to be transmitted by the mobile station using a notification message propagated via a telephone call.

11. The method of claim 1, wherein generating assistance data at the G-SLC further comprises:
    determining a plurality of satellites that are in view at the location of the particular one of the cell towers which the mobile station is in radio contact with.

12. The method of claim 11, wherein the assistance data narrows a search window for acquisition of satellite data from the plurality of satellites that are in view at the location of the particular one of the cell towers which the mobile station is in contact with.

13. The method of claim 1, wherein at least one of the cell towers in at least a third one of the plurality of networks is not supported by a location center.

* * * * *